US 9,560,929 B2

(12) United States Patent
Verhoeven et al.

(10) Patent No.: US 9,560,929 B2
(45) Date of Patent: Feb. 7, 2017

(54) BEVERAGE PREPARATION DEVICE

(75) Inventors: Ramon Eduard Verhoeven, Heerhugowaard (NL); Johannes Theodorus Huiberts, Spanbroek (NL)

(73) Assignee: BRAVILOR HOLDING B.V., Heerhugowaard (NL)

( * ) Notice: Subject to any disclaimer, the term of this patent is extended or adjusted under 35 U.S.C. 154(b) by 361 days.

(21) Appl. No.: 14/005,209

(22) PCT Filed: Mar. 27, 2012

(86) PCT No.: PCT/NL2012/050195
§ 371 (c)(1),
(2), (4) Date: Oct. 23, 2013

(87) PCT Pub. No.: WO2012/134280
PCT Pub. Date: Oct. 4, 2012

(65) Prior Publication Data
US 2014/0041527 A1    Feb. 13, 2014

(30) Foreign Application Priority Data

Mar. 31, 2011   (NL) .................................... 2006503

(51) Int. Cl.
*A47J 31/20*        (2006.01)
*B30B 5/00*         (2006.01)
*A47J 31/36*        (2006.01)

(52) U.S. Cl.
CPC ............. *A47J 31/36* (2013.01); *A47J 31/3614* (2013.01); *A47J 31/3619* (2013.01)

(58) Field of Classification Search
CPC ..... A47J 31/36; A47J 31/3614; A47J 31/3619
(Continued)

(56) References Cited

U.S. PATENT DOCUMENTS 6,129,006 A * 10/2000 Schmed ............... A47J 31/3609
                                                        99/287
7,673,555 B2 * 3/2010 Nosler .................. A47J 31/007
                                                        426/433
(Continued)

FOREIGN PATENT DOCUMENTS

CH   EP 0486433 A1 *  5/1992   .......... A47J 31/3614
CN      1618381 A     5/2005
(Continued)

OTHER PUBLICATIONS

International Search Report of PCT/NL2012/050195 dated Jul. 5, 2012.

*Primary Examiner* — Dana Ross
*Assistant Examiner* — Ket D Dang
(74) *Attorney, Agent, or Firm* — Morgan, Lewis & Bockius LLP

(57) ABSTRACT

The invention relates to a beverage preparation device comprising a cylindrical chamber with a jacket provided with a filling opening for receiving a powder-like or granular substance and an ejection opening for ejecting the substance, a first and a second compression element, positioned perpendicularly with respect to a longitudinal axis of the chamber, a displacement member for relative displacement of the first compression element with respect to the jacket between a filling position, a compression position and an ejection position, wherein the compression elements in the filling position delimit a filling volume and the compression elements in the compression position delimit a preparation volume positioned along a longitudinal axis and at a distance from the filling volume, wherein the first compression element engages the inner wall of the jacket in a fluid-tight manner and a fluid supply channel and a fluid discharge (Continued)

Figure 1A:
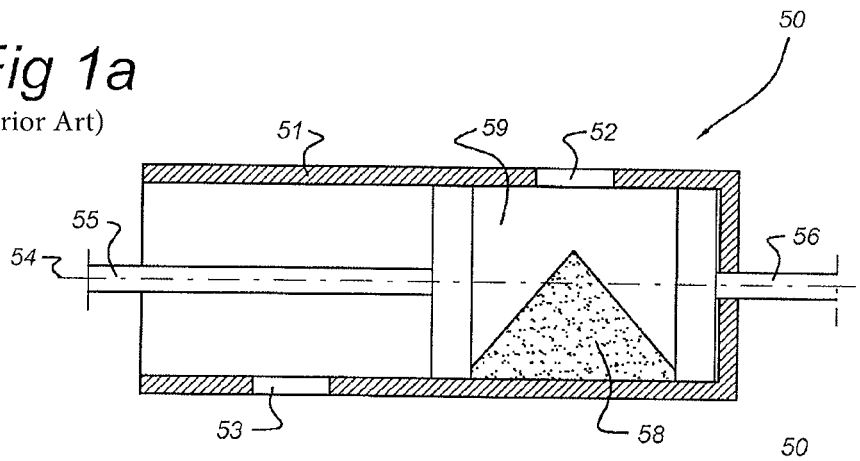

channel that in the compression position is in fluid-communication with the preparation volume.

18 Claims, 6 Drawing Sheets

(58) Field of Classification Search
USPC .................. 99/297, 284, 495, 496, 279, 287–302 P,99/304–315, 323.3, 331; 100/247–249, 251
See application file for complete search history.

(56) References Cited

U.S. PATENT DOCUMENTS

| | | | |
|---|---|---|---|
| 2004/0011206 A1 | 1/2004 | Versini | |
| 2005/0109223 A1 | 5/2005 | Comte | |
| 2006/0254428 A1* | 11/2006 | Glucksman | A47J 31/3609 99/302 P |
| 2007/0012196 A1* | 1/2007 | Sato | A47J 31/24 99/348 |
| 2008/0276807 A1 | 11/2008 | Righetti | |
| 2010/0034942 A1* | 2/2010 | Illy | A47J 31/002 426/433 |
| 2010/0236418 A1* | 9/2010 | Sampaoli | A47J 31/3614 99/287 |

FOREIGN PATENT DOCUMENTS

| | | | |
|---|---|---|---|
| DE | 102007060813 A1 | 6/2009 | |
| EP | 0117583 A1 | 9/1984 | |
| EP | 0202517 A1 * | 11/1986 | ......... A47J 31/3609 |
| EP | 0299399 A2 | 1/1989 | |
| EP | 1483992 A1 | 8/2004 | |
| GB | 2165140 A * | 4/1986 | ......... A47J 31/3614 |
| JP | H119463 A | 1/1999 | |
| JP | 2005152637 | 6/2005 | |
| JP | 2009516563 A | 4/2009 | |

* cited by examiner

BEVERAGE PREPARATION DEVICE

CROSS REFERENCE TO RELATED APPLICATIONS

The present application is the 35 U.S.C. 371 National Stage of International Application Number PCT/NL2012/050195, filed Mar. 27, 2012, which claims priority from Netherlands patent application NL2006503, filed Mar. 31, 2011, the contents of which are incorporated herein by reference.

The invention relates to a beverage preparation device comprising a cylindrical chamber with a
- jacket provided with a filling opening for receiving a powder-like or granular substance and an ejection opening for ejecting the substance,
- a first and a second compression element, positioned perpendicularly with respect to a longitudinal axis of the chamber,
- a displacement member for relative displacement of the first compression element with respect to the jacket between a filling position, a compression position and an ejection position, wherein the compression elements in the filling position delimit a filling volume and the compression elements in the compression position delimit a preparation volume positioned along a longitudinal axis and at a distance from the filling volume, wherein the first compression element engages the inner wall of the jacket in a fluid-tight manner and
- a fluid supply channel and a fluid discharge channel that in the compression position is in fluid-communication with the preparation volume.

Such a device is known from for example US 2007/0012196. This publication describes a device for preparing a hot beverage, especially coffee, with two piston elements mounted shiftably in an elongated, cylindrical housing between a filling position, a preparation position and an ejection position. In the filling position a powder-like or granular substance, such as ground coffee beans, can be inserted into the housing between the piston elements via a filling opening in the housing. When displacing the piston elements towards each other the ground gets compressed between the piston surfaces and an inner wall of the housing. Along their circumference the piston elements adjoin an inner wall of the housing. In the preparation position, at the location of the part of the housing where the ground gets compressed, the housing is provided with circumferentially mounted hot water supply channels. The hot water supply channels supply hot water, which mixes with the ground. The thus-formed beverage is discharged to a container, such as a cup or a jug, again by means of circumferentially mounted beverage discharge channels. After preparation of the beverage the pistons move linearly in the housing to an ejection position wherein used-up ground gets pushed out of the housing via an open end by one of the piston elements.

A disadvantage of the known device is, that the seal positioned between the piston elements and the inner wall of the housing is loaded heavily. Because the piston elements and the wall of the cylindrical housing move with respect to each other the seal between the piston circumference and the wall can lose its fluid-tightness. A high ambient temperature, exposure to hot water and dragging contact with the powder-like or granular substance as well as wear influence the life span and the reliability of the seal in a disadvantageous manner. This has as a consequence that the known device needs maintenance relatively often, wherein the device usually needs to be taken-apart.

Another disadvantage when using the pistons is that residues of the powder-like or granular substance can accumulate behind the pistons, and can only be removed when the housing and pistons are disassembled.

An object of the invention is therefore to provide a device for preparing beverages of the abovementioned type which requires less maintenance.

It is a further object of the invention to provide a device wherein the reliability and the life span of the seals is improved.

It is a yet further object of the invention to provide a device that allows simple cleaning, preferably without disassembly.

Hereto the device according to the invention is characterized in that the second compression element is fixedly connected to the jacket, and that an ejection member that is displaceable along the longitudinal axis with respect to the second compression element is arranged in the chamber, which ejection member is fixedly connected to a shaft which enters through the second compression element via a shaft seal arranged in the second compression element, wherein a fluid communication is present between the side of the ejection member turned towards the first compression element and the side facing towards the second compression element of the ejection member, wherein the circumference of the ejection member is positioned at a certain distance from the inner wall of the product chamber in such a way that free fluid transport between the circumference of the ejection member and the inner wall of the product chamber is possible, wherein in the compression position the ejection member is positioned close to or adjoins the second compression element and in the ejection position the ejection member is positioned at a distance from the second compression element, close to or outside of the ejection opening.

Because the second compression element is connected fixedly to the jacket of the cylindrical (product) chamber, a moving seal is not required. The compression of the product in the preparation position takes place between the first compression element, that is positioned tightly to the wall of the product chamber with its circumference and the second compression element connected fixedly to the jacket of the chamber. The shaft of the ejection member which is positioned between the two compression elements, enters in axial direction through the fixedly arranged second compression member and is sealed against this member around the shaft perimeter. Such a relatively small seal, slidably placed around the shaft, constitutes a reliable and durable seal compared to a seal along the inner wall of the product chamber. Furthermore, due to the possibility of free fluid transport between the circumference of the ejection member and the inner wall of the product chamber, the product chamber can be easily cleaned due to residues being able to be flushed away past the ejection member.

Additionally the shaft seal according to the invention is, during preparation and during stand-by of the heated product chamber, only exposed to high temperatures during the duration of preparation, and this seal is relatively cool during stand-by time, such that the life-time of the shaft seal is extended.

Furthermore the arrangement of the ejection member according to the invention between the product chamber and the shaft seal prevents that the powder-like or granular product comes into contact with the shaft seal. By doing so the wear of this shaft seal is reduced.

Finally, the volume between the ejection member and the second compression element fixedly connected to the jacket of the product chamber can be flushed with water, because the ejection member according to the invention is arranged in the product chamber in a non-fluid-tight manner, without disassembly of the device being necessary.

In an embodiment the ejection member comprises a sieve member. By means of the sieve member an even water distribution via the second compression member to the preparation volume can be obtained. Because the sieve member adjoins the second compression member in the preparation position, with the second compression member forming the back wall of the product chamber, still a sufficiently large pressure can be exerted on the substance in the product chamber in order to form a compact tablet when using a relatively thin and therefore easily deformable sieve.

In a further embodiment the fluid supply channel is connected to a supply opening in the second compression element and the fluid discharge channel extends in axial direction up to through the first compression element. By supply and discharge of fluid to, and respectively beverage from, the product chamber via the end surfaces, a compact and reliable beverage preparation device is obtained wherein the fluid ducts extend substantially in axial direction, with a minimum of radially projecting duct parts.

In another embodiment the chamber is displaceable by means of the displacement member to and from the first compression member that is arranged in a fixed manner. Because of the fixedly arranged fluid discharge of the first compression member, beverage prepared in the product chamber can easily be supplied to the user via a stationary delivery point. The cylindrical product chamber is moved in axial direction together with the fluid supply channel, in conjunction with the axial displacement of the ejection member. Therein displacement of the ejection member can be obtained by dragging along by the displaceable product chamber.

In a further embodiment the product chamber is provided with a cam for the engagement with the ejection member and axial displacement thereof upon displacement of the chamber from the compression position to the ejection position. Displacement of the ejection member from the compression position to the ejection position is effected by linear displacement of the product chamber, which brings the ejection member to the ejection position by taking it along via a cam, without the need for a separate drive for the ejection member.

Preferably the cylindrical product chamber is displaced along one or more axial guiding rails running along the outer circumference of the product chamber.

In a yet further embodiment the shaft is detachably connected at an end to a part of the device housing, wherein the shaft has such a length that when displacing the chamber to the ejection position the ejection member is positioned near the ejection opening and when displacing the chamber from the filling position to the preparation position the ejection member is taken along by the second compression element wherein the detachable connection is broken. Thus in an efficient manner it is achieved that the ejection element is in principle passively displaceable, wherein only the product chamber moves. Therefore active displacement means for displacing the ejection member with respect to the product chamber are not strictly necessary. The length of the shaft therein can be chosen in such a way that the ejection member pushes the used-up product out of the housing in the ejection position and additionally is taken along by the jacket of the chamber from the filling position to the compression position.

In a yet even further embodiment the detachable connection of the shaft to the part of the device housing is formed by a magnetic connection. Such a magnetic connection is relatively resistant to wear, because there are no parts subjected to friction. Therein, on the one hand the end of the shaft can be provided with a magnet and the part of the device housing to which the shaft is connected can be provided with a ferromagnetic material. On the other hand the shaft can also comprise ferromagnetic material at its end and the corresponding part of the device housing a magnet.

In yet another embodiment a heating member is mounted around the chamber. By means of the heating member, for example in the form of a heating band, the product chamber can be kept at a desired temperature during stand-by time.

In a further embodiment the fluid supply channel discharges into a distribution volume behind a distribution plate that is provided with discharge openings distributed thereon for supplying hot water during use by the hot water supply via the distribution volume to the chamber. By using a distribution plate with discharge openings distributed evenly on the surface, wherein behind the distribution plate a distribution volume is arranged that is connected to the fluid supply channel an efficient distribution of hot water over the total cross-section of the product chamber can be obtained.

DETAILED DESCRIPTION

An exemplary embodiment of a prior art device as well as a device according to the invention will be elucidated further by means of example with reference to the accompanying figures.

Figure 1B:
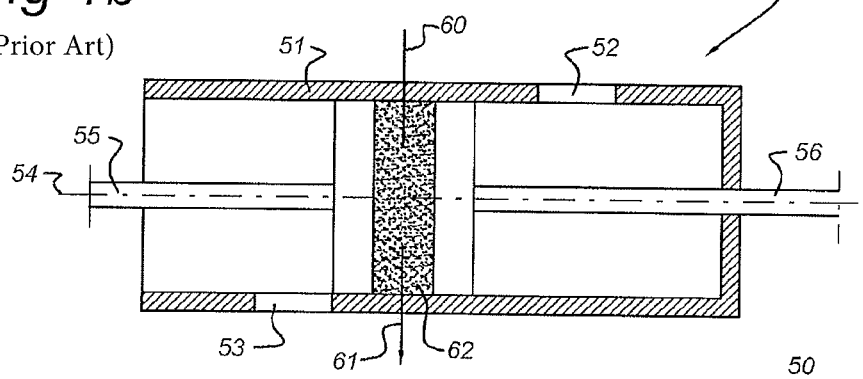
Figure 1C:
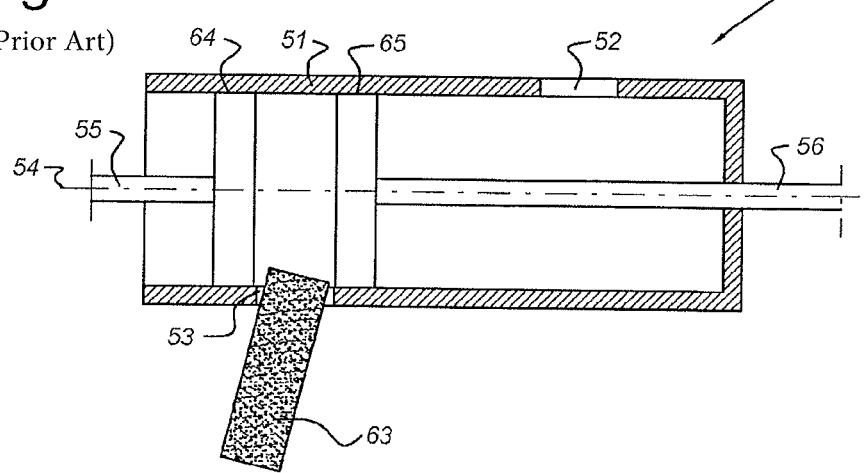
Figure 2:
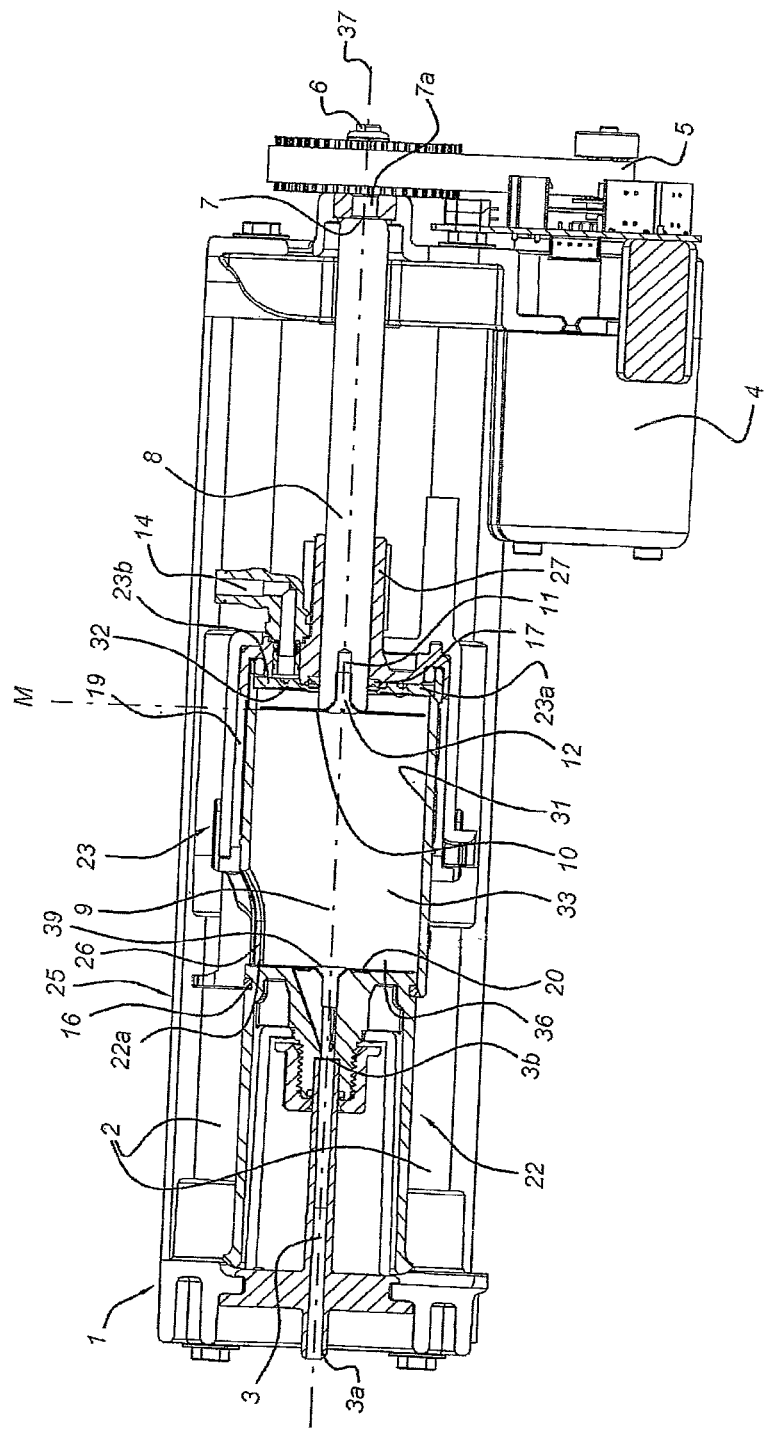
Figure 3:
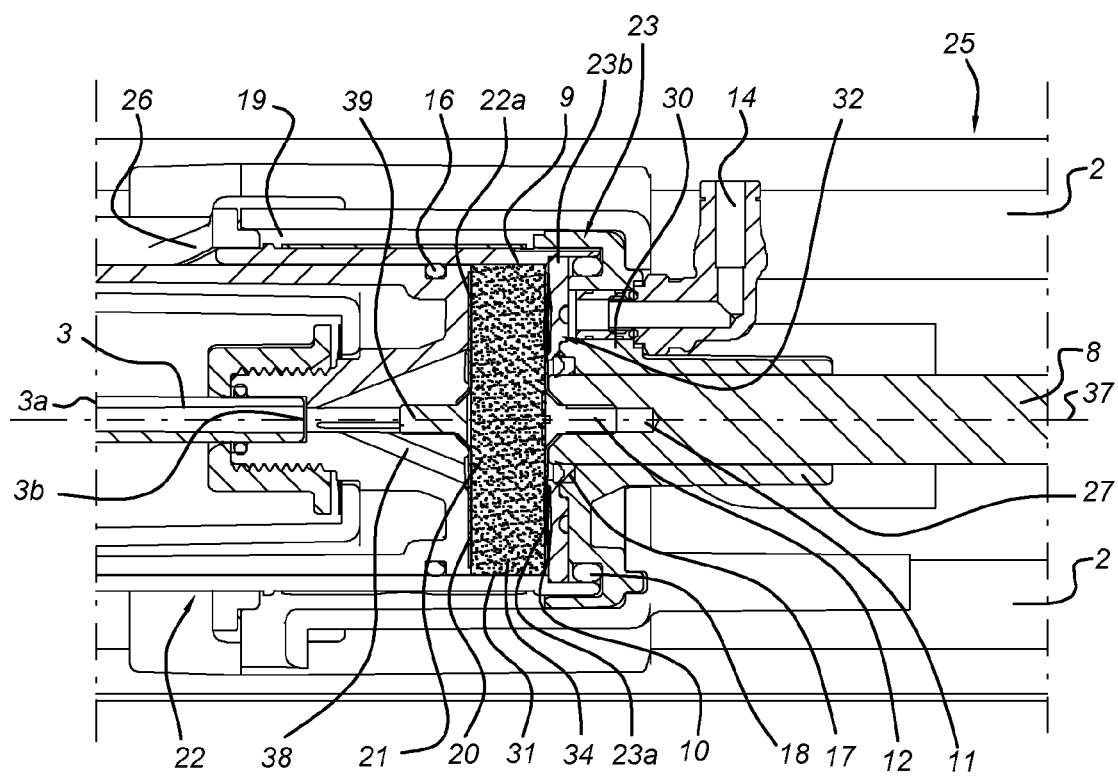
Figure 4:
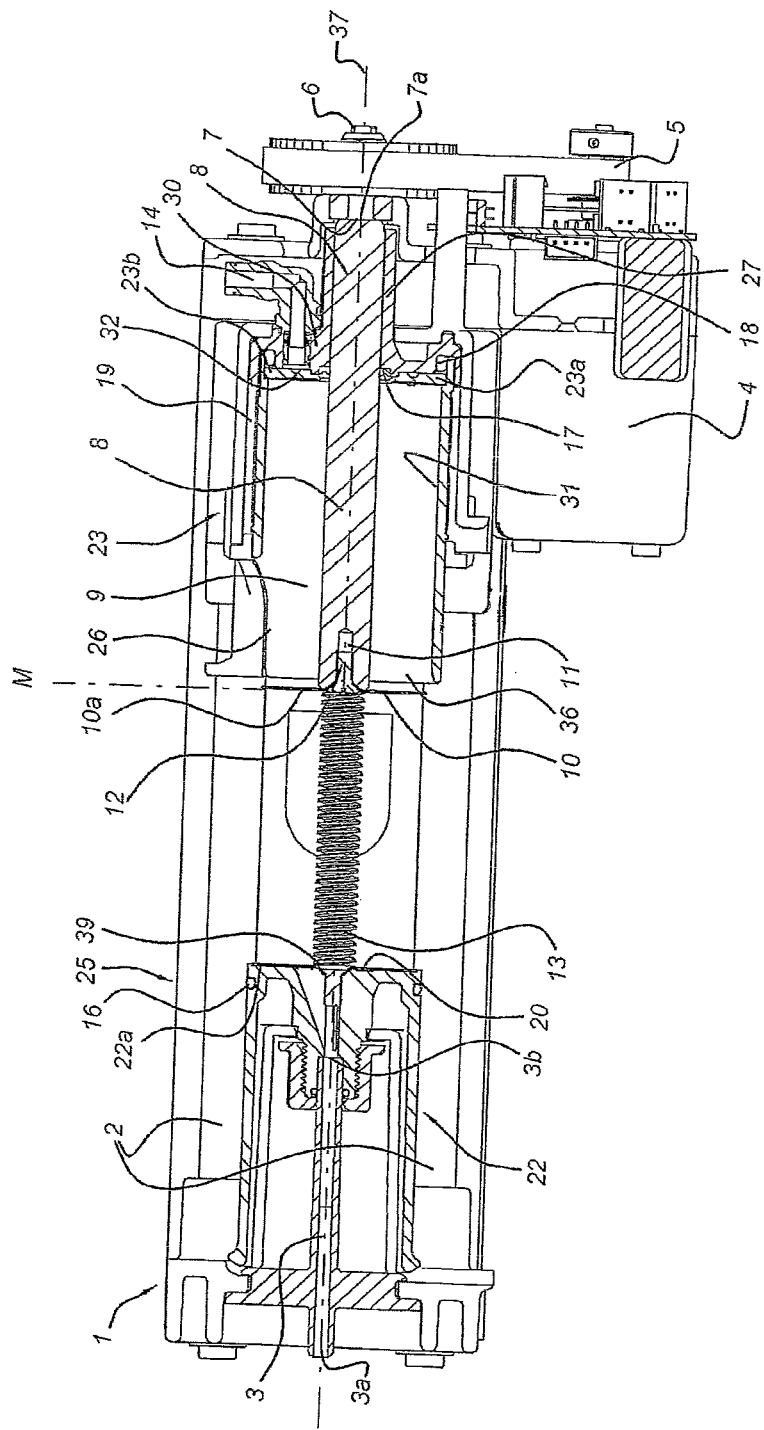
Figure 5:
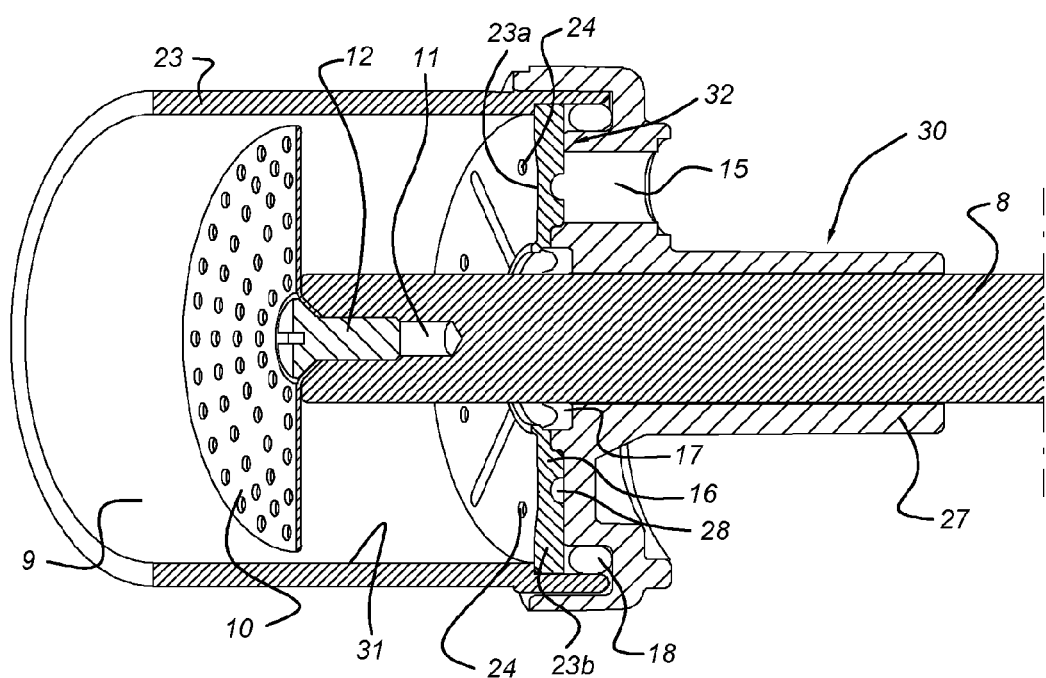
Figure 6:
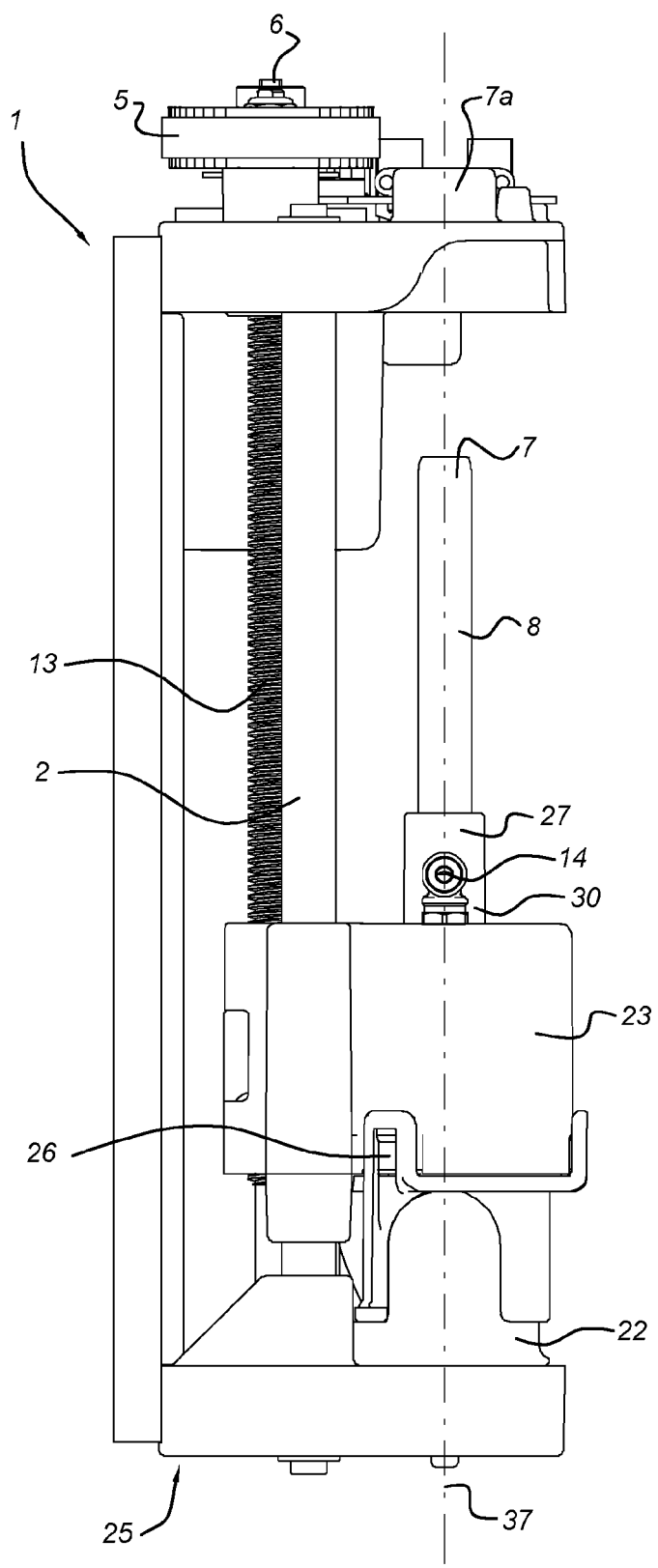

FIGS. 1a-1c show an embodiment of a known beverage preparation device in respectively the filling position, the preparation position and the ejection position, FIG. 2 shows an embodiment of a device according to the invention in the filling position, FIG. 3 shows the device according to FIG. 2 in the preparation position, FIG. 4 shows the device according to FIG. 2 in the ejection position, FIG. 5 shows an enlarged close-up of the second compression element and the hot water supply, and FIG. 6 shows a plan view of the device according to the invention.

FIG. 1a shows a horizontal beverage preparation device according to the prior art in the filling position. The known beverage preparation device 50 comprises a cylindrical housing 51 with a filling opening 52, an ejection opening 53 and a pair of compression elements in the form pistons 55, 56 displaceable along a longitudinal axis 54. In the filling position the pistons 55, 56 are displaced away from each other, and a powder-like or granular substance 58, such as ground coffee, is placed via the filling opening in the filling volume 59 between the pistons 55, 56.

Via a drive that is not shown the pistons 55, 56 are consequently displaced toward each other and the substance 58 gets compressed into a tablet, in the preparation position as shown in FIG. 1b. In the preparation position hot water is squeezed through the preparation volume and the compressed tablet contained therein via supply 60 and discharge 61 indicated by arrows.

Finally both pistons 55, 56 move jointly to the ejection position as shown in FIG. 1c, wherein the pistons move away from each other and the tablet 63 is removed under the influence of gravity via the ejection opening. Especially near the seals 64 and 65 the high temperatures concerned with preparing the beverage, dragging contact with the powder-like substance and wear due to contact of the wall with the chamber are problematic. Additionally, residues of the powder-like substance can accumulate behind the piston 56, which residues can only be removed by disassembly of the pistons 55, 56 and the housing 51.

FIG. 2 shows an axial cross-section of an embodiment of the beverage preparation device 1 according to the invention in the filling position. The device 1 comprises a cylindrical product chamber 9 that is displaceable in axial direction along a longitudinal axis 37 of an elongated, horizontally arranged housing 25. The product chamber 9 is connected to a drive motor 4 and longitudinal guides 2 for obtaining the linear displacement. A fixedly arranged compression member 22 adjoins an inner wall 31 of the product chamber 9 in a fluid-tight manner via a sealing ring 16. A beverage discharge channel 3 extends in axial direction through the compression member 22 and is in the filling position (as well as in the preparation position) in fluid-connection with the filling volume 33 that at the front end is delimited in the filling position by the fixed compression member 22.

The product chamber 9 is provided with an ejection opening 36 at a front end that is facing the fixed compression member 22. The opposite front end of the product chamber 9 is sealed by an end wall 32 that is fixedly connected to a jacket 23 of the product chamber 9. A hot water supply channel 14 discharges in the product chamber 9 through the end wall 32.

An axially displaceable sieve connection shaft 8 with a sieve member 10 on one of its ends, passes through a central opening in the end wall 32, and is guided by a shaft support part 27 of the end wall. The sieve 10 is connected to the sieve connection shaft 8 by means of a sieve fixing part 12, for example a screw, which fixing part 12 is fixed in the sieve receiving volume 11. The sieve connection shaft 8 is displaceable with respect to the housing 25. The sieve receiving volume 11 is by way of example arranged for receiving a screw. The circumference of the sieve member 10 is positioned at a certain distance from the inner wall 31 of the product chamber 9 in such a way that free fluid transport between the circumference of the sieve member 10 and the inner wall 31 of the product chamber 9 is possible. A shaft sealing ring 17 seals the sieve connection shaft 8 with respect to the shaft support part 27 and prevents fluid from leaving the product chamber past the shaft 8.

The horizontal displacement of the product chamber 9 along the longitudinal guides 25 is driven by a motor drive 4 that is able to drive a drive shaft 6 by means of a tooth belt 5 at the right side of the device. The drive shaft 6 is connected to a further drive shaft 13, that is provided with a screw thread. The drive shaft 13 is connected to the product chamber 9. When displacing the product chamber 9 via the drive shaft 13 to the preparation position as shown in FIG. 3 the end wall 32 adjoins the sieve member 10 and the sieve member 10 and the shaft 8 are displaced to the left by the end wall. At the right end of the sieve member 8 a magnet 7 is provided by means of which the sieve member 10 is kept at fixed position on the right during a first part of the displacement trajectory of the product chamber 9 until the sieve member 10 contacts the end wall 32 at the dragging point M and the magnetic contact is broken. The magnet 7 can contact the magnet contacting part 7a that is positioned at the right of the shaft 8. The positions of the magnet 7 and the magnet contacting part 7a can be exchanged if desired: the magnet 7 can also be positioned at the location of the magnet contacting part 7a as shown in FIG. 1, as a result of which a similar functioning is achieved. The magnet contacting part 7a is required to be made of a ferromagnetic material that can be attracted by the magnet 7, such as iron.

When returning the sieve connection shaft 8, that is displaced to the left side of the product chamber 9, to the ejection position or the stand-by position use can be made of friction occurring between the shaft sealing ring 17 and the sieve connection shaft 8. Use can also be made of a cam mounted on the product chamber 9, as discussed in the foregoing.

The product chamber 9 is connected to the hot water supply channel 14 at the upper right side, which hot water supply channel 14 is able to move along with the displaceable pressure chamber 9. Around the pressure chamber 9 a volume is provided with a heating band 19. This heating band can keep the cylinder 9 at use temperature, for example in the range of 70-80° C. in case of the preparation of coffee in the product chamber.

The fixed compression member 22 with a fixed compression surface 22a at the right end thereof, is provided with the beverage discharge channel 3 along the longitudinal axis 37. The beverage discharge channel 3 has a supply opening 3b that is positioned at the right end of the beverage discharge channel 3 and a delivery opening 3a that is positioned at the left end thereof. Hot beverage is delivered to a beverage container through the delivery opening 3a. The supply opening 3b is in fluid connection with the volume to the right of the fixed compression member 22. In FIG. 4 this fluid connection is made by means of a further channel 38 that is positioned behind a sieve fixing part 39 of a fixed sieve 20. The further channel therein discharges in the volume to the right of the fixed compression part 22, in which volume the hot beverage is prepared during use. The further channel can also be positioned in the sieve fixing part 39 of the fixed sieve 20, wherein the discharge of the further channel 38 is positioned in the sieve fixing part 39. The sieve 20 therein is positioned over the channel in such a way that it is prevented that the granular or powder-like substance, such as ground coffee, is dragged along through the supply opening 3b of the beverage discharge channel 3 to the delivery opening 3a.

In FIGS. 2-4 the fixed compression member 22 is positioned at a fixed position with respect to the housing 25. The product chamber 9 and the sieve member 10 are displaceable with respect to the housing 25. Embodiments in which the product chamber is arranged in a fixed manner and the compression member 22 and the sieve member 10 are displaceable with respect to the housing 25 are also within the scope of the invention.

The operation of the beverage preparation device according to the invention will be further elucidated with reference to FIGS. 2-5 in which respectively the filling position, the preparation position and the ejection position of the product chamber 9 and the sieve member 10 positions with respect to the housing 25 are shown.

As shown in FIG. 2 the product chamber is positioned in the filling position in a position in which the ejection opening 36 of the chamber 9 is sealed by the compression member 22. In the filling position the product chamber 9 is displaced along the guiding rails 2 by the motor drive 4 towards such a position, that the sieve member 10 contacts the compression surface 23a of the end wall 32 of the chamber 9. In this position the sieve member 10 is positioned in a dragging position at the location of the dragging point M. At a further displacement of the product chamber 9 to the left the sieve 10 is dragged along by the end wall 32. Then at that point the connection between the sieve connection shaft 8 and the magnet contacting part 7a is also broken. In this position the jacket 23 of the product chamber 9 overlaps the fixed compression member 22 that seals the front end ejection opening 36. The product chamber 9 can now be filled with a granular substance, such as ground coffee beans, through the filling opening 26, without it being able to fall from the chamber 9.

At a yet further displacement of the product chamber 9 to the left towards the preparation position, as shown in FIG. 3, the filling opening 26 is displaced past the fixed compression member 22, such that this filling opening 26 is closed. A preparation chamber 34 is delimited by a wall 31 of the chamber 9 and the compression surfaces 22a and 23a of, respectively, the fixed compression member 22 and the end wall 32. At further displacement of the displaceable product chamber to the left the substance in the product chamber 9 gets compressed between the fixed compression surface 22 on the one hand and the sieve 10 and the displaceable compression surface 23a on the other hand. The displaceable product chamber is now in the preparation position in which a compressed product tablet is formed between the compression surfaces 22a and 23a Hot water can now be supplied to the compressed substance through the hot water supply duct 14 via the displaceable compression surface 23a, allowing the hot water to mix with the compressed substance. The pressure at which the hot water is supplied, can be varied indirectly by the user by means of a control panel on the beverage machine, of which the beverage device 1 is part. In this way for example, in case the substance in the product chamber is formed by ground coffee, espresso can be made at relatively high pressure and so-called 'flat' coffee at relatively low pressure. The thus-formed hot beverage can now exit the device via the supply opening 3b through the beverage discharge channel 3 and the delivery opening 3a in order to be delivered to a container of a consumer.

In the preparation position the sealing ring 16 between the perimeter of the fixed compression member 22 and the inner wall 31 of the chamber 9 contributes to the build-up of pressure in the preparation volume 34 by providing a seal between the wall 31 and the fixed compression member 22.

Starting from the preparation position, the displaceable product chamber 9 can now be displaced again to the right until the ejection position as shown in FIG. 4 is reached. By means of the sealing ring 17 product residues are scraped off from the sieve connection shaft 8. Subsequently the cylinder 9 can be flushed, or a subsequent delivery session can be started.

In the ejection position as shown in FIG. 4 the displaceable product chamber 9 is positioned completely at the right on the guiding rails 2 and the sieve 10 is near the ejection opening 36 that is formed by the open left front end surface of the chamber 9. This means that a compressed product tablet, such as composed of coffee powder or ground tea leaves, formed in a preceding preparation position between the fixed compression part 22 and the displaceable compression part 23, gets ejected from the chamber 9 and removed out of the housing 25 via an opening under the influence of gravity. The length of the sieve connection member 8 therein is chosen such that upon reaching the ejection position by the product chamber 9 the sieve is positioned near or to the left of the open end 36 of the chamber 9. In this position the chamber 9 can be flushed with hot water from the hot water supply channel 14, allowing any product residues positioned between the sieve 10 and the closed-off end of the chamber 9 to be flushed away.

FIG. 5 shows a cut-away perspective view of a close-up of a compression part 23 of the end wall 32 that is displaceable along with the product chamber 9 according to the invention. The end wall 32 is provided with a shaft support part 27 in which the sieve connection member is moveably suspended. Between the shaft support part 27 and the chamber 9 a distribution plate 23b is mounted, that is provided with the compression surface 23a. The distribution plate 23b is provided with multiple discharge openings 24 distributed evenly over the surface of the distribution plate 23b. Between the hot water supply channel 14 and the discharge openings 24 a distribution volume 28 is formed. The discharge openings 24 are slightly recessed with respect to the outside of the compression surface 23a in order to obtain an improved distribution of the water between the compression surface 23a and the sieve member 10 and therefore over the compressed product in the compression position. The distribution plate 23b is clamped between the jacket 23 of the chamber 9 and the shaft support part 27. Between the sieve connection shaft 8 and the shaft support part 27 the shaft sealing ring 17 is mounted. Additionally a jacket sealing ring 18 is mounted between the shaft support part 27 and the jacket 23 of the chamber 9. The shaft support part 27 is furthermore provided with a receiving part 15 for the hot water supply channel 14. The sieve member 10 is provided with holes that are large enough to allow hot water from the discharge openings 24 to pass through to the product chamber 9, but small enough to prevent product particles from passing through in the opposite direction. The sieve member 10 has a diameter that is smaller than the inner diameter of the jacket 23, in such a way that no closed-off connection is established between the sieve member 10 and the inner wall 31 of the chamber 9. In this way hot water is allowed to flow past the perimeter of the sieve member 10, for example to flush the volume between the sieve member 10 and the distribution plate 23b, wherein water supplied via the hot water supply channel 14 is allowed to leave the volume past the sieve member 10. FIG. 5 furthermore shows a sieve fixing part 12 in the form of a screw, with which the sieving part is fixed in a bore 11.

FIG. 6 shows a plan view of the device 1 according to the invention in the preparation position. In FIG. 6 it can be seen how the drive shaft 13 is positioned with respect to the jacket 23. In FIG. 6 the drive shaft 13 by means of example comprises a spindle, wherein the spindle engages a screw thread (not shown) adapted to the spindle in the jacket 23. In FIG. 6 the drive shaft 13 is positioned at a distance from the longitudinal axis 37 and from the product chamber 9 (not shown), wherein it is prevented that the drive shaft 13 enters the product chamber 9 (not shown) comprised by the jacket 23. When driving the drive shaft 6 which is connected to the drive shaft 13 the jacket 23 is displaced along the guiding bars 2. The length of the drive shaft 13 is chosen such that the jacket can be displaced between two positional extremes, i.e. the preparation position and the stand-by position.

REFERENCE NUMERALS

1. Device
2. Guiding bar
3. Beverage discharge channel
3a. Delivery opening
3b. Supply opening
4. Motor drive
5. Tooth belt
6. Drive shaft
7. Magnet
7a. Magnet contacting part
8. Sieve connection shaft
9. Chamber 10. Sieve member
10a. Sieve surface
11. Sieve receiving volume
12. Sieve fixing part
13. Further drive shaft
14. Hot water supply channel
15. Receiving part for hot water supply channel
16. Sealing ring
17. Shaft sealing ring
18. Cylinder sealing ring
19. Volume for heating band
20. Fixed sieve
21. Compressed ground
22. Fixed sieve member
22a. Fixed compression surface
23. Jacket
23a. Displaceable compression surface
23b. Distribution plate
24. Discharge opening
25. Device housing
26. Filling opening
27. Shaft support part
28. Distribution volume
29. Housing opening
30. Housing end part
31. Inner wall
32. End wall
33. Filling volume
34. Preparation volume
35. Chamber
36. Ejection opening
37. Longitudinal axis
38. Further channel
39. Sieve fixing part
40. -
41. -
42. -
43. -
44. -
45. -
46. -
47. -
48. -
49. -
50. Beverage preparation device
51. Housing
52. Filling opening
53. Ejection opening
54. Longitudinal axis
55. Piston
56. Piston
57. -
58. Granular substance
59. Filling volume
60. Water supply
61. Water discharge
62. Preparation volume
63. Coffee tablet
64. Seal
65. Seal
M. Dragging point

The invention claimed is:
1. Beverage preparation device (1) comprising
a jacket (23) defining a cylindrical chamber (9) provided with a filling opening (26) in said jacket (23) for receiving a powder-like or granular substance and at a first transverse side of said cylindrical chamber (9) an ejection opening (36) for ejecting the substance,
a first compression element (22) and a second compression element (23b, 32), both positioned perpendicularly with respect to a longitudinal axis (37) of the chamber (9), the second compression element (23b, 32) being fixedly connected to the jacket (23) and forming a transverse wall of the chamber (9) that is stationary relative to the chamber (9) and that is situated at a second transverse side of the chamber (9), opposite the first transverse side,
a displacement member (2, 4, 5, 13) adapted for relative axial displacement of the first compression element (22) with respect to the jacket (23) and said second compression element which is fixedly connected to the jacket and stationary relative to the chamber defined by said jacket, between a filling position, a compression position and an ejection position, wherein the compression elements (22; 23b, 32) in the filling position delimit a filling volume with said first compression element closing off said ejection opening while not closing off said filling opening, wherein the compression elements (22; 23b, 32) in the compression position delimit a preparation volume positioned along the longitudinal axis (27) at a distance from the filling volume, wherein in said compression position the first compression element (22) engages an inner wall (31) of the jacket (23) in a fluid-tight manner, and
a fluid supply channel (14) and a fluid discharge channel (3) that in the compression position are in fluid-communication with the preparation volume,
wherein an ejection member (10) is displaceably arranged in the chamber (9) along the longitudinal axis (37) between the compression position in which it is positioned close to or adjoins the second compression element (23b, 32) and the ejection position in which it is situated at an axial distance from the second compression element (23b, 32), close to or outside of the ejection opening (36) wherein said axial distance is greater than an axial distance of said second compression element to the filling opening,
said ejection member (10) is fixedly connected to an axial shaft (8) which enters through the second compression element (23b, 32) via a shaft seal (17) arranged in the second compression element (23b, 32), a fluid communication being present between the side of the ejection member (10) turned towards the first compression element (22) and the side facing towards the second compression element (23b, 32) of the ejection member (10), the circumference of the ejection member (10) being positioned at a certain distance from the inner wall (31) of the chamber (9) in such a way that free fluid transport between the circumference of the ejection member (10) and the inner wall (31) of the chamber (9) is possible,
wherein the fluid supply channel (14) is arranged in the second compression element (23b,32), the fluid supply channel (14) discharging in the chamber (9) via the compression surface (23a) of the second compression element (23b, 32) and allows flushing of the chamber (9) via water supplied by the fluid supply channel (14) in the ejection position, the water being allowed to leave the chamber (9) past the ejection member (10).

2. The device (1) according to claim 1, wherein the ejection member (10) comprises a sieve member.

3. The device (1) according to claim 2, wherein the fluid supply channel (14) is connected to a supply opening in the second compression element (23b, 32) and the fluid discharge channel (3) extends in axial direction until through the first compression element (22).

4. The device (1) according to claim 3, wherein the fluid supply channel (14) discharges in a distribution volume (28) behind a distribution plate (23b) that is provided with discharge openings (24) distributed thereon for supplying, during use, hot water through the hot water supply via the distribution volume (28) to the chamber (9).

5. The device (1) according to claim 1, wherein the fluid supply channel (14) is connected to a supply opening in the second compression element (23b, 32) and the fluid discharge channel (3) extends in axial direction until through the first compression element (22).

6. The device (1) according to claim 5, wherein the fluid supply channel (14) discharges in a distribution volume (28) behind a distribution plate (23b) that is provided with discharge openings (24) distributed thereon for supplying, during use, hot water through the hot water supply via the distribution volume (28) to the chamber (9).

7. The device (1) according to claim 5, wherein the chamber (9) is displaceable by the displacement member (2, 4, 5, 13) to and from the first compression element (22) that is arranged in a fixed manner.

8. The device (1) according to claim 7, wherein the chamber (9) is provided with a cam for engagement with the ejection member (10) and axial displacement thereof when displacing the chamber (9) from the compression position to the ejection position.

9. The device (1) according to claim 1, wherein the chamber (9) is displaceable by the displacement member (2, 4, 5, 13) to and from the first compression element (22) that is arranged in a fixed manner.

10. The device (1) according to claim 9, wherein the chamber (9) is provided with a cam for engagement with the ejection member (10) and axial displacement thereof when displacing the chamber (9) from the compression position to the ejection position.

11. The device according to claim 10, wherein the chamber is displaceable along axial guiding rails (2).

12. The device (1) according to claim 11, wherein the shaft (8) at an end is detachably connected to a part (7a) of the device housing (25), wherein the shaft (8) has such a length that when displacing the chamber (9) to the ejection position the ejection member (10) is positioned near the ejection opening (36), and when displacing the chamber (9) from the filling position to the preparation position the ejection member (10) is taken along by the second compression element (23b, 32) wherein the detachable connection (7, 7a) is broken.

13. The device (1) according to claim 12, wherein the detachable connection (7, 7a) of the shaft with the part of the device housing (25) is formed by a magnetic connection.

14. The device (1) according to claim 13, wherein a heating member is mounted around the chamber (9).

15. The device according to claim 9, wherein the chamber is displaceable along axial guiding rails (2).

16. The device (1) according to claim 1, wherein the shaft (8) at an end is detachably connected to a part (7a) of a device housing (25), wherein the shaft (8) has such a length that when displacing the chamber (9) to the ejection position the ejection member (10) is positioned near the ejection opening (36), and when displacing the chamber (9) from the filling position to the preparation position the ejection member (10) is taken along by the second compression element (23b, 32) wherein the detachable connection (7, 7a) is broken.

17. The device (1) according to claim 16, wherein the detachable connection (7, 7a) of the shaft with the part of the device housing (25) is formed by a magnetic connection.

18. The device (1) according to claim 1, wherein a heating member is mounted around the chamber (9).

* * * * *